US007185433B2

(12) United States Patent
Miller et al.

(10) Patent No.: US 7,185,433 B2
(45) Date of Patent: Mar. 6, 2007

(54) TURBINE NOZZLE SEGMENT AND METHOD OF REPAIRING SAME

(75) Inventors: Matthew N. Miller, Maineville, OH (US); James W. Caddell, Jr., Milford, OH (US); James M. Caldwell, Alexandria, KY (US); Brian A. Norton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 11/015,611

(22) Filed: Dec. 17, 2004

(65) Prior Publication Data

US 2006/0133929 A1 Jun. 22, 2006

(51) Int. Cl.
*B23P 15/04* (2006.01)
*F01D 9/04* (2006.01)

(52) U.S. Cl. ............... 29/889.22; 29/402.07; 29/557; 415/191; 415/200; 415/209.4; 415/210.1

(58) Field of Classification Search ........... 415/191, 415/200, 208.1, 208.2, 209.2, 209.3, 209.4, 415/210.1; 29/402.06, 402.07, 557, 889.1, 29/889.21, 889.22
See application file for complete search history.

(56) References Cited

U.S. PATENT DOCUMENTS

| | | | |
|---|---|---|---|
| 3,797,085 A | 3/1974 | Aartman | |
| 3,802,046 A | 4/1974 | Wachtell et al. | |
| 4,305,697 A | 12/1981 | Cohen et al. | |
| 4,326,833 A | 4/1982 | Zelahy et al. | |
| 5,248,240 A | 9/1993 | Correia | |
| 5,269,057 A | 12/1993 | Mendham | |
| 5,272,809 A | 12/1993 | Robertson et al. | |
| 5,332,360 A * | 7/1994 | Correia et al. | 415/209.3 |
| 5,690,469 A | 11/1997 | Deal et al. | |
| 5,758,416 A | 6/1998 | Reverman et al. | |
| 5,797,725 A | 8/1998 | Rhodes | |
| 5,813,832 A | 9/1998 | Rasch et al. | |
| 6,154,959 A | 12/2000 | Goodwater et al. | |
| 6,173,491 B1 | 1/2001 | Goodwater et al. | |
| 6,416,278 B1 * | 7/2002 | Caddell et al. | 415/191 |
| 6,793,457 B1 * | 9/2004 | Caddell et al. | 415/209.4 |
| 6,905,308 B1 * | 6/2005 | Hagle et al. | 415/209.4 |
| 2003/0106215 A1 * | 6/2003 | Heyward et al. | 29/889.1 |

* cited by examiner

*Primary Examiner*—Christopher Verdier
(74) *Attorney, Agent, or Firm*—Adams Evans P.A.; David L. Narciso

(57) ABSTRACT

A method for repairing a stationary turbine nozzle segment having at least one vane disposed between outer and inner structural bands includes providing an engine-run turbine nozzle segment having at least one vane disposed between outer and inner bands, wherein the outer band and the vanes are previously replaced components of the segment and the inner band is an original component of the segment; separating the inner band from the nozzle segment; repairing damage in the outer band and/or the vane; and joining the outer band and the vane to a newly manufactured replacement inner band segment. The replacement inner band segment includes: a structural inner band; and an integral structural collar adapted to receive an inner end of the at least one vane.

6 Claims, 5 Drawing Sheets

TURBINE NOZZLE SEGMENT AND METHOD OF REPAIRING SAME

BACKGROUND OF THE INVENTION

This invention relates generally to gas turbine engines and more particularly to the repair of turbine nozzle segments used in such engines.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. Aircraft engines typically include stationary turbine airfoils, herein referred to as vanes, that enhance engine performance by appropriately influencing gas flow and pressure within the turbine section. In multi-stage turbine sections, turbine vanes are placed at the entrance of each turbine stage to channel combustion gases into the rotating turbine blades located downstream of the vanes. Turbine vanes are typically segmented around the circumference thereof with each vane segment, herein referred to as a nozzle segment, having one or more vanes disposed between inner and outer bands that define the radial flowpath boundaries for the hot combustion gases flowing through the nozzle segment. These nozzle segments are mounted to the engine casing to form an annular array with the vanes extending radially between the rotating blades of adjacent turbine stages.

Nozzle segments are located directly in the gas stream and therefore are exposed during operation to high temperature, corrosive air that can limit the effective service life of these components. Accordingly, nozzle segments are typically fabricated from high temperature cobalt or nickel-based superalloys and are often coated with corrosion and/or heat resistant materials. Furthermore, nozzle segments are ordinarily cooled internally with cooling air extracted from the compressor to prolong service life. Even with such efforts, portions of the nozzle segments, particularly the vanes, can exhibit cracks, corrosion, and other damage such that the nozzle segments must be either repaired or replaced to maintain safe, efficient engine operation. Because nozzle segments are complex in design, are made of relatively expensive materials, and are expensive to manufacture, it is generally more desirable to repair them whenever possible.

One existing repair technique is described in U.S. Pat. No. 6,416,278, issued to the assignee of the present invention. This technique involves salvaging an inner band and attaching it to a newly manufactured replacement inner band segment which includes an outer band and one or more vanes. This is possible because the inner band typically experiences less severe operating conditions and has a longer life than the other nozzle segment structure. However, the repair process itself incrementally reduces the life of the inner band because the processes used to clean and strip old protective coatings also removes base material of the inner band further reducing the structural capability of the part. At a subsequent repair cycle, this may result in certain portions of the inner band structure, herein referred to as an inner band segment, having a wall thickness that is less than an acceptable minimum for re-use, while the previously replaced outer band and vanes are nearly new.

Accordingly, to avoid scrapping the entire nozzle segment in such a situation, it would be desirable to have a method for salvaging the previously replaced and repairable portion of the nozzle segment.

BRIEF SUMMARY OF THE INVENTION

The above-mentioned need is met by the present invention, which according to one aspect provides a method of repairing a turbine nozzle segment which includes providing an engine-run turbine nozzle segment having at least one vane disposed between outer and inner bands, wherein the outer band and the vanes are previously replaced components of the segment and the inner band is an original component of the segment; separating the inner band from the nozzle segment; repairing damage in the outer band and the vane; and joining the outer band and the vane to a newly manufactured replacement inner band segment, made for example by casting, forging, or other manufacturing process. The replacement inner band segment includes an inner band having opposed first and second sides. The first side has at least one airfoil-shaped recess formed therein for receiving the vane; and the cold side has a raised collar integrally formed therein.

According to another aspect of the invention, a turbine nozzle segment includes an outer band; a replacement inner band segment including an inner band; and at least one vane disposed between the outer and inner bands. The outer band and the vane are previously used and repaired structure and the replacement inner band segment is newly manufactured structure.

According to another aspect of the invention, a repaired turbine nozzle segment has at least one vane disposed between an outer band and an inner band, the nozzle segment being repaired by the method of: separating the inner band from the nozzle segment; repairing damage in the outer band and the vane; and joining the outer band and the vane to a newly manufactured replacement inner band segment having an inner band.

According to another aspect of the invention, a replacement inner band segment for use in repairing turbine nozzle segments includes: an arcuate inner band having a hot side and an opposed cold side. The hot side has at least one airfoil-shaped recess formed therein; and the cold side has a raised collar integrally formed therein.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
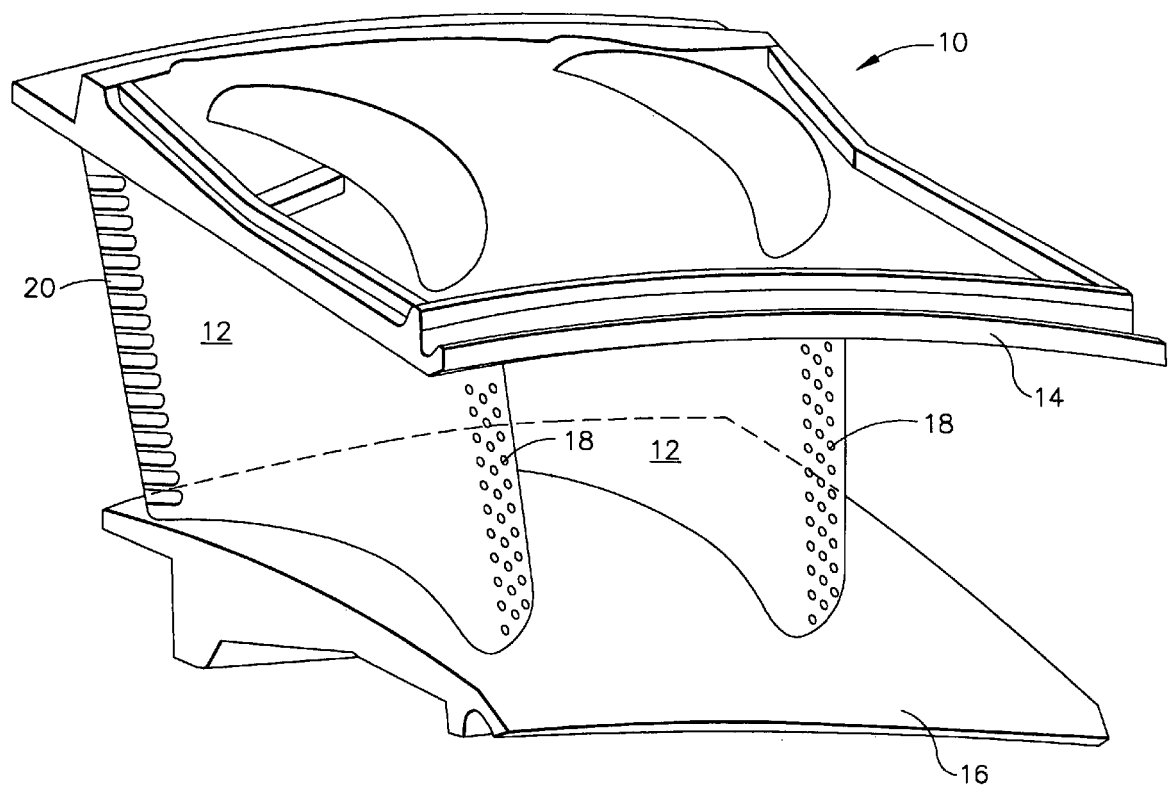
FIG. 1 is a perspective view of a gas turbine engine run turbine nozzle segment.

Referring to the drawings wherein identical reference numerals denote the same elements throughout the various views, FIG. 1 shows a turbine nozzle segment 10 having first and second nozzle vanes 12. The vanes 12 are disposed between an arcuate outer band 14 and an arcuate inner band 16. The vanes 12 define airfoils configured so as to optimally direct the combustion gases to a turbine rotor (not shown) located downstream thereof. The outer and inner bands 14 and 16 define the outer and inner radial boundaries, respectively, of the gas flow through the nozzle segment 10. The vanes 12 can have a plurality of conventional cooling holes 18 in the forward region and trailing edge slots 20 formed therein. Cooling holes 18 are most typically found in first stage nozzle segments; later stage nozzle segments ordinarily do not utilize such cooling holes. The nozzle segment 10 is preferably made of a high quality superalloy, such as a cobalt or nickel-based superalloy, and may be coated with a corrosion resistant material and/or thermal barrier coating. A gas turbine engine will include a plurality of such segments 10 arranged circumferentially in an annular configuration. While the repair methods of the present invention are described herein with respect to a two-vane nozzle segment, it should be recognized that the present invention is equally applicable to nozzle segments having any number of vanes.

During engine operation, the nozzle segment 10 can experience cracking or damage such as might result from local surface over-temperature caused by the hot gas stream or foreign objects impacting thereon. As mentioned above, a portion of the nozzle segment 10 may become degraded to the point where it cannot be repaired by known repair processes. In cases where the outer band 14 or vanes 12 are non-repairable, they may be replaced through a process such as that described in U.S. Pat. No. 6,416,278, assigned to the assignee of the present invention. The present invention is directed to a method of repairing a nozzle segment in which the inner band 16 is non-repairable while other nozzle segment structure is repairable by known repair processes. Although in current known applications the inner band is 16 typically exposed to less severe operating conditions and has a longer life than the other nozzle segment structure, each repair cycle, whether it be a conventional repair or a component replacement repair such as that described in the '278 Patent, incrementally reduces the life of the inner band 16 as a result of the processes used to remove protective coatings that also remove base material.

Figure 2:
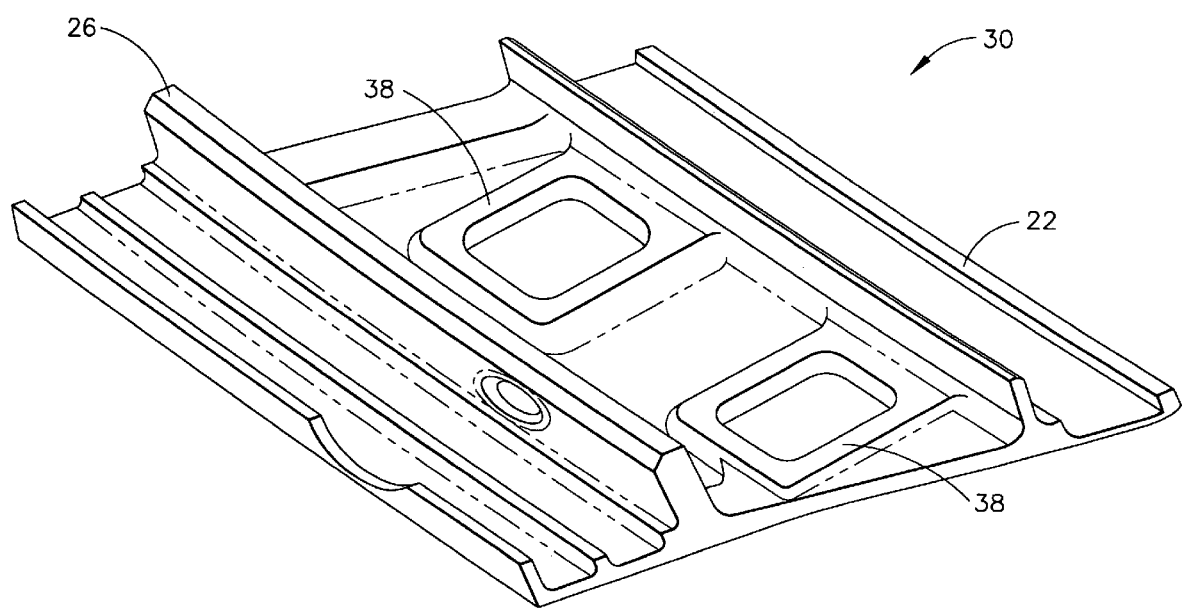
FIG. 2 is a bottom perspective view of a replacement inner band segment used in the repair method of the present invention.
Figure 3:
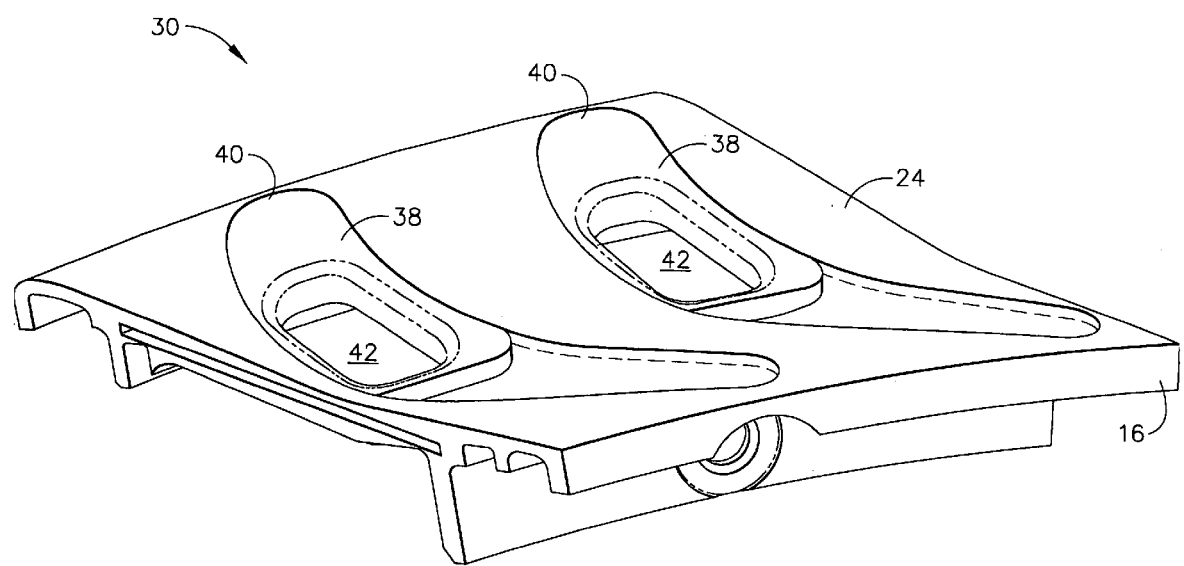
FIG. 3 is a top perspective view of the replacement inner band segment of FIG. 2.

The repair method includes the principal steps of separating the inner band 16 from the nozzle segment 10, and then joining a specially designed, newly manufactured replacement inner band segment to the structure from which the inner band 16 was removed. FIGS. 2 and 3 show different views of one of the newly manufactured replacement inner band segments at 30. In the illustrated example the replacement inner band segment 30 is an integrally cast piece having a cold side 22 (the side facing away from the hot gas flowpath) and a hot side 24 (the side facing the hot gas flowpath), and includes conventional structure such as support flanges 26. The support flange 26 provides structural support to the inner band 16 and also provides a mounting function when the nozzle segment 10 is installed in an engine.

As shown in FIG. 2, at least one reinforcement feature referred to as a collar 38 is integrally formed on the cold side 22 of the replacement inner band segment 30. The collar 38 is a solid, upraised block which strengthens the replacement inner band segment 30 between the structural supports. It may be a continuous lateral member or it may be divided into two or more upraised portions as illustrated. Two recessed pockets 40, best seen in FIG. 3, are formed in the hot side 24 of the replacement inner band segment 30. The perimeter of the pockets 40 approximates the airfoil contour of the vanes 12. The recesses 40 are integrally formed as part of the replacement inner band segment 30 or can be generated by a further operation. For example, they could be formed by a machining process such as plunge electrical discharge machine (EDM) using an EDM electrode having the airfoil shape. The pockets 40 are aligned along a single parallel plunge axis for each nozzle segment. Each pocket 40 is oriented so that the respective vane 12 can be properly seated therein. A receiving slot 42 is formed at the bottom of each pocket 40. The receiving slots 42 extend radially through the collar 38. The receiving slots 42 can also be formed by plunge EDM. In this case, both receiving slots 42 are formed on parallel axes. This can be accomplished in a single operation using dual electrodes of appropriate position and shape. The receiving slots 42 are parallel to permit installation of the raised bosses 46, which are described in more detail below.

More specifically, the initial step of the repair method is to inspect engine run nozzle segments returned from the field for servicing to identify such segments 10 that have a non-repairable inner band 16, while the other nozzle segment structure is repairable by a conventional method. Frequently, this will occur in an engine-run segment in which the inner band 16 is an original component of the segment 10, while the outer band 14 and vanes 12 were newly-manufactured components at the time of their installation during a previous repair cycle, for example as a part of the repair described in the above-noted '278 Patent. Once a suitable nozzle segment 10 has been identified, it should be stripped of any coating materials (such as corrosion or thermal resistant coatings) that may be present. The coating material may be stripped using any suitable technique, such as grit blasting, chemical baths, and the like, or by a combination of such techniques. The next step is to repair cracks in the outer band 14 and vanes 12, using known repair techniques such as alloy brazing, alloy build up, welding and the like. These conventional repairs will be carried out as needed depending on the condition of the outer band 14 and vanes 12. Any corrosion or thermal coatings that were originally used are not reapplied at this time.

Figure 4:
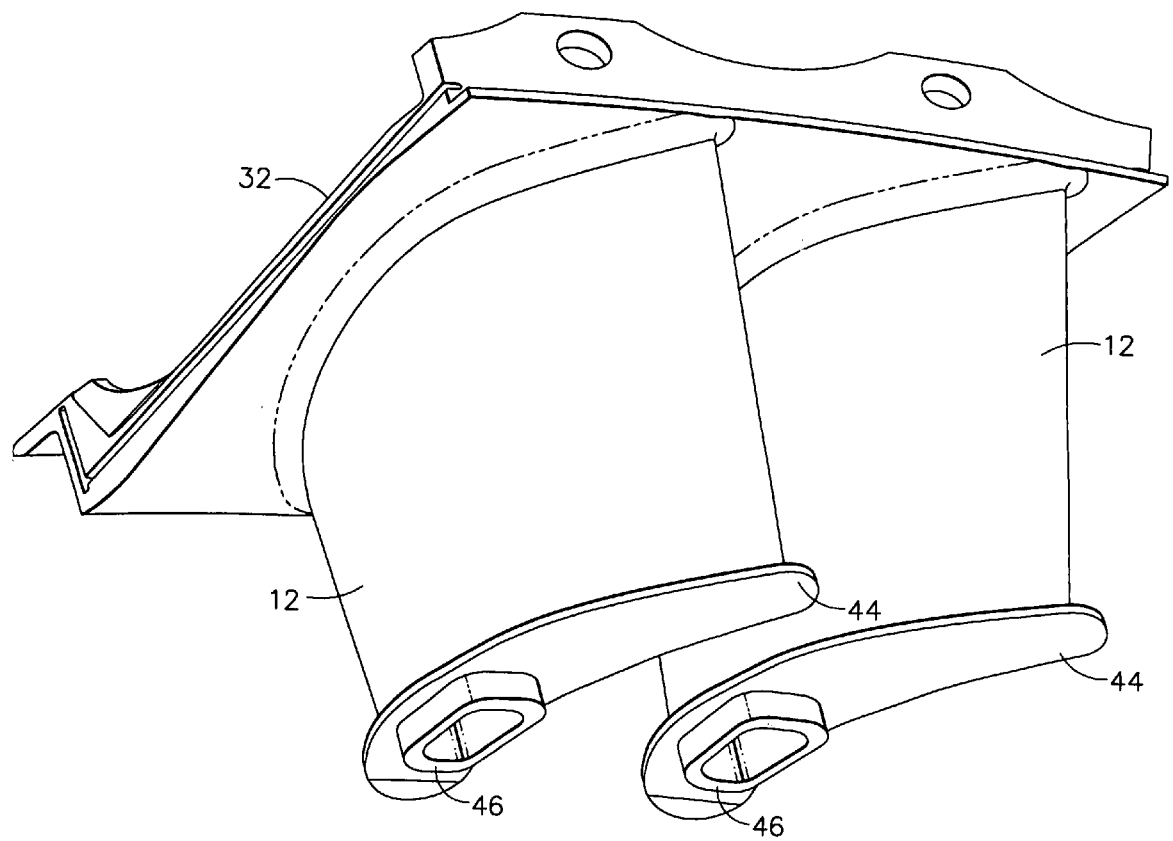
FIG. 4 is a perspective view of the outer band and vanes of the turbine nozzle segment of FIG. 1 after machining thereof.

The next step is to separate the inner band 16 from the rest of the nozzle segment 10 without damaging the airfoils. Separation is accomplished by rough cutting through the inner band 16 around the perimeter of both vanes 12. The cutting can be performed by any conventional means such as an abrasive cutting wheel or electrical discharge machining. After separation, the unsalvageable structure is discarded, and the outer band 14 and vanes 12 are prepared for joining to the replacement inner band segment 30. As shown in FIG. 4, it is seen that the inner band 16 is separated and machined in such a manner to leave a mounting platform 44 integrally formed on the radially inner end of each vane 12. Each mounting platform 44 has a raised boss 46 integrally formed on the underside thereof as a result of the separation process.

The mounting platforms 44 on the inner ends of the vanes 12 are shaped and sized to tightly interface with the pockets 40. The bosses 46 on the airfoil vane end are sized to fit into the receiving slots 42 on the replacement inner band segment 30. All of these surfaces are machined on parallel axes for both vanes 12. Thus, the bosses 46 are oriented to be installed into the receiving slots 42, which are also machined on the same parallel axes. If the bosses 46 were machined on the radial axes of the respective vanes 12, then they could not be installed into the slots 42 because the converging surfaces would bind given the height of the bosses 46. The mounting platforms 44, which are significantly shorter than the bosses 46, are received in the pockets 40 of the replacement inner band segment 30.

Figure 5:
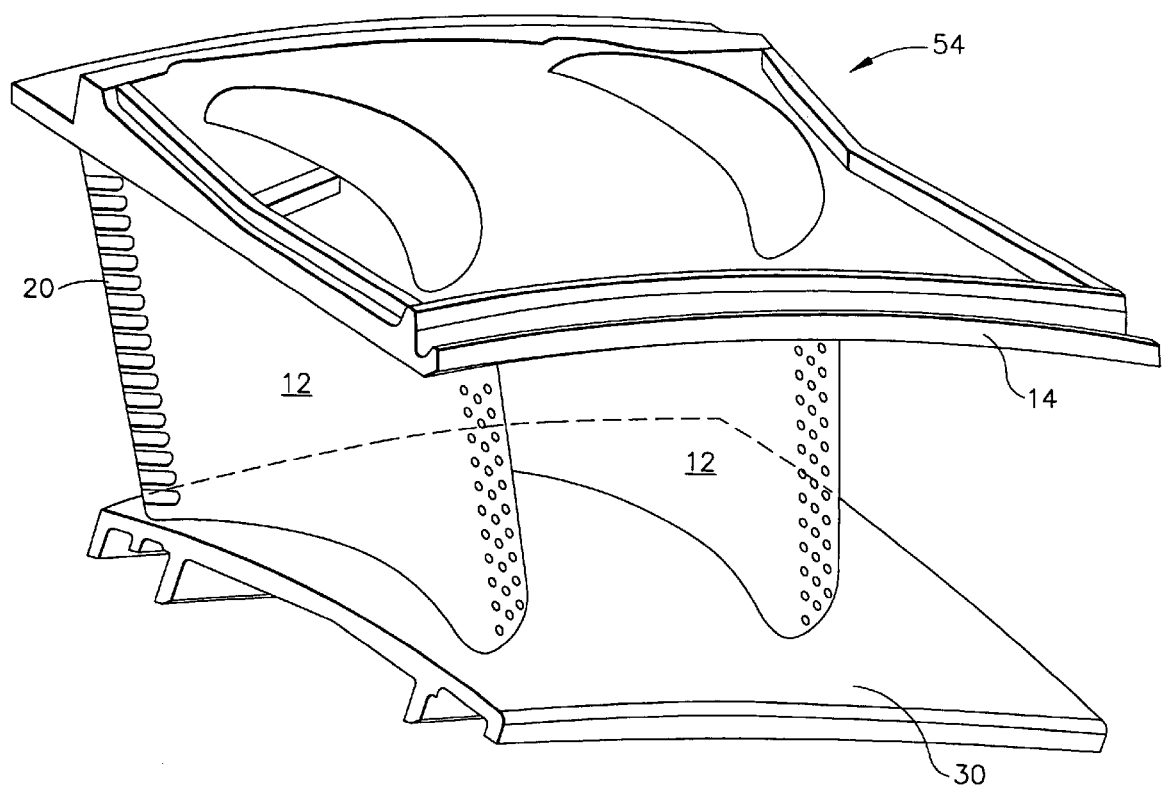
FIG. 5 is a perspective view of a repaired turbine nozzle segment.

After all crack repairs are completed and the machining operations are completed the outer band 14 and vanes 12 and the replacement inner band segment 30 are assembled to form a repaired nozzle segment 54 shown in FIG. 5. As indicated above, the replacement inner band segment 30 is assembled by installing the vane mounting platforms 44 into the corresponding inner band pocket 40 and the vane bosses 46 into the corresponding inner band receiving slots 42. The parts are then joined together by bonding along the collar-boss interfaces on the inner band cold side 22. Bonding may be accomplished in a conventional manner such as brazing or welding although brazing is generally preferred given the thermal gradients that the part will be exposed to during engine operation and the detrimental effect of weld distortion. One preferred joining operation would be to first locally tungsten inert gas (TIG) weld each inner band receiving slot 42 to the respective vane boss 46. The next step would be to fill the gap between parts with alloy and braze powder and apply braze slurry over the exposed edges at the interfaces. On the cold side 22, braze alloy is applied to the collar-to-boss and collar-to-inner band interfaces. On the hot side 24, braze alloy is applied to the mounting-platform-to-pocket interfaces. The assembly is then placed in a furnace, positioned with the replacement inner band segment 30 up, and brazed.

Lastly, any corrosion or thermal protection coatings that were originally used are reapplied in a known manner. Additionally, improved coatings could also be applied. The result is a repaired nozzle segment 54 having a previously used section (corresponding to the outer band 14 and vanes 12) and a newly manufactured section (corresponding to the replacement inner band segment 30). The inner band collar 38 provides structural reinforcement to the replacement inner band segment. It also provides a secondary retention feature. That is, if the mounting platform-to-inner band joint fails, then the collar 38 would prevent the vanes 12 from separating from the replacement inner band segment 30 because the inner band collar overhang prevents the vane collar 38 from being pulled through the replacement inner band segment 30.

In one embodiment, the replacement inner band segment 30 is fabricated from the same material as the original inner band 16 to produce a repaired nozzle segment 54 that retains the material properties of the original nozzle segment 10. However, in another embodiment, the replacement inner band segment 30 is fabricated from a different material, preferably an alloy having enhanced material properties. It is often the case that during the service life of a gas turbine engine component such as a nozzle segment, improved alloys suitable for use with such components are developed. Traditionally, engine operators would have to replace existing components with new components fabricated from the improved alloy to realize the enhanced material properties. However, by fabricating the replacement inner band segment 30 from the improved alloy, the repaired nozzle segment 54 will obtain, in part, the enhanced material properties.

The foregoing has described a fabricated repair method for turbine nozzle segments as well as a replacement inner band segment used in the repair process. While specific embodiments of the present invention have been described, it will be apparent to those skilled in the art that various modifications thereto can be made without departing from the spirit and scope of the invention as defined in the appended claims

What is claimed is:

1. A method of repairing a turbine nozzle segment, comprising:
providing an engine-run turbine nozzle segment having at least one vane disposed between outer and inner bands, wherein said outer band and said at least one vane are previously replaced components of said segment and said inner band is an original component of said segment;
separating said inner band from said nozzle segment;
repairing damage in at least one of said outer band and said at least one vane; and
joining said outer band and said at least one vane to a newly manufactured replacement inner band segment, said replacement inner band segment including:
a replacement inner band having opposed first and second sides; said first side having at least one airfoil-shaped recess formed therein for receiving said vane; and said second side having a raised collar integrally formed therein; wherein the step of joining said outer band and said vane to said replacement inner band segment comprises:
providing a slot in said collar;
inserting a portion of said vane into said slot; and
joining said vane to said collar and to said replacement inner band segment.

2. The method of claim 1 further comprising forming a pocket in said replacement inner band, said collar being joined to said replacement inner band at said pocket.

3. The method of claim 1 wherein said vane of said replacement inner band segment is joined to said collar and to said replacement inner band by brazing.

4. The method of claim 1 wherein separating said inner band from said nozzle segment comprises cutting through said inner band of said nozzle segment near said vane.

5. The method of claim 4 wherein said cutting is carried out so as to define a generally airfoil-shaped mounting platform around the periphery of an inner end of said vane, said mounting platform being shaped to fit into said recess of said replacement inner band segment.

6. The method of claim 1 wherein said replacement inner band segment is fabricated from a material that has enhanced material properties with respect to the material that said inner band is fabricated from.

* * * * *